(12) United States Patent
Tsuiki et al.

(10) Patent No.: US 10,705,197 B2
(45) Date of Patent: Jul. 7, 2020

(54) SENSOR DEVICE AND TOILET DEVICE EQUIPPED THEREWITH

(71) Applicant: TOTO LTD., Kitakyushu-shi, Fukuoka (JP)

(72) Inventors: Shoichi Tsuiki, Kitakyushu (JP); Yuta Tanogashira, Kitakyushu (JP)

(73) Assignee: TOTO LTD., Kitakyushu-Shi, Fukuoka ( * ) Notice: Subject to any disclaimer, the term of this patent is extended or adjusted under 35 U.S.C. 154(b) by 314 days.

(21) Appl. No.: 15/461,735

(22) Filed: Mar. 17, 2017

(65) Prior Publication Data
US 2017/0285160 A1 Oct. 5, 2017

(30) Foreign Application Priority Data

Mar. 30, 2016 (JP) .................. 2016-069402

(51) Int. Cl.
| | |
|---|---|
| *G01S 13/56* | (2006.01) |
| *A47K 13/10* | (2006.01) |
| *G01S 13/88* | (2006.01) |
| *A47K 13/30* | (2006.01) |
| *E03D 5/10* | (2006.01) |
| *E03D 9/00* | (2006.01) |
| *E03D 9/08* | (2006.01) |

(52) U.S. Cl.
CPC .............. *G01S 13/56* (2013.01); *A47K 13/10* (2013.01); *G01S 13/88* (2013.01); *A47K 13/305* (2013.01); *E03D 5/105* (2013.01); *E03D 9/002* (2013.01); *E03D 9/08* (2013.01)

(58) Field of Classification Search
CPC ......... G01S 13/56; G01S 13/88; A47K 13/10; A47K 13/305; E03D 5/105; E03D 9/08; E03D 9/002

USPC ........................................................... 342/28
See application file for complete search history.

(56) References Cited

U.S. PATENT DOCUMENTS 3,333,270 A * 7/1967 Page ...................... G01S 11/06
342/458
4,062,011 A * 12/1977 Preston ............... G01S 13/5242
342/94

(Continued)

FOREIGN PATENT DOCUMENTS

| CN | 103946718 A | 7/2014 | |
|---|---|---|---|
| EP | 2594968 A1 * | 5/2013 | ........... G01S 13/751 |

(Continued)

*Primary Examiner* — Vladimir Magloire
*Assistant Examiner* — Nuzhat Pervin
(74) *Attorney, Agent, or Firm* — Pearne & Gordon LLP

(57) ABSTRACT

According to one embodiment, a sensor device includes a transmitter part, a receiver part, a signal generation part, and a determination part. The transmitter part is configured to emit a radio wave outside as a transmission wave. The receiver part is configured to receive a reflection wave reflected by an object as a reception wave. The signal generation part is configured to generate a first output signal generated based on the transmission wave and the reception wave, a second output signal provided with a phase different from that of the first output signal, and a third output signal generated based on the first output signal and the second output signal. The determination part is configured to determine presence or absence of an object based on the first output signal, the second output signal, and the third output signal.

6 Claims, 8 Drawing Sheets

(56) References Cited

U.S. PATENT DOCUMENTS

| | | | | |
|---|---|---|---|---|
| 6,011,819 A | * | 1/2000 | Shiro | H04L 27/02 375/345 |
| 6,380,882 B1 | * | 4/2002 | Hegnauer | G01S 13/348 340/554 |
| 9,194,944 B2 | * | 11/2015 | Nakagawa | G01F 23/2845 |
| 9,632,177 B2 | * | 4/2017 | Inagaki | G01S 15/02 |
| 2005/0114992 A1 | * | 6/2005 | Todoroki | E03D 3/00 4/313 |
| 2008/0074307 A1 | * | 3/2008 | Boric-Lubecke | A61B 5/0205 342/28 |
| 2010/0152600 A1 | * | 6/2010 | Droitcour | A61B 5/05 600/534 |
| 2013/0113644 A1 | * | 5/2013 | Nakagawa | G01F 23/2845 342/6 |
| 2013/0301391 A1 | * | 11/2013 | Altman | G01S 13/003 367/100 |
| 2014/0241125 A1 | | 8/2014 | Muguida | |
| 2014/0355385 A1 | * | 12/2014 | Inagaki | G01S 15/02 367/99 |
| 2016/0209260 A1 | * | 7/2016 | Rice | G01S 13/583 |
| 2017/0016221 A1 | | 1/2017 | Yamamoto | |

FOREIGN PATENT DOCUMENTS

| | | | | |
|---|---|---|---|---|
| JP | S63-249076 A | | 10/1988 | |
| JP | 2001013238 A | * | 1/2001 | G01S 7/40 |
| JP | 2003079538 A | * | 3/2003 | A47K 13/12 |
| JP | 2007-321440 A | | 12/2007 | |
| JP | 2015-127477 A | | 7/2015 | |
| TW | 201540243 A | | 11/2015 | |

* cited by examiner

SENSOR DEVICE AND TOILET DEVICE EQUIPPED THEREWITH

CROSS-REFERENCE TO RELATED APPLICATIONS

This application is based upon and claims the benefit of priority from Japanese Patent Application No. 2016-069402, filed on Mar. 30, 2016; the entire contents of which are incorporated herein by reference.

FIELD

Embodiments of the invention relate to a sensor device and a toilet device equipped therewith.

BACKGROUND

Conventionally, there is known a sensor device for transmitting/receiving radio waves to sense e.g. An object or human body using a Doppler signal (see, e.g., Patent Literature 1). Such a sensor device senses a sensing target based on the amplitude value of the signal depending on the moving velocity of the sensing target or the distance between the sensing target and the sensor device.

Japanese Unexamined Patent Publication No. 2004-286675 discloses a sensor device comprising an oscillator for generating a transmission wave to be emitted outside, an antenna part for transmitting the transmission wave and receiving reflection waves reflected by a sensing target as reception waves, a mixer part for generating output signals obtained by interference of the reception waves, and a determination part for determining the presence or absence of an object based on the output signals obtained by the mixer part. In this sensor device, the mixer part generates two output signals having a phase difference of 90 degrees. The determination part determines the presence or absence of an object based on the amount of change of the two output signals with respect to an arbitrary reference value.

In such a conventional sensor device, the two output signals are provided with a phase difference of 90 degrees. Thus, the sensing signal has a generally unique value for the distance from the sensor device to the sensing target. Accordingly, the stationary or generally stationary state of the object can be sensed accurately. Furthermore, distortion in the output signals can also be lowered while keeping the phase difference of the two output signals at 90 degrees. Thus, approaching/leaving of the sensing target can be determined accurately from the temporal relation of the two output signals on the time axis.

Here, the transmission wave transmitted from the sensor device and the reception wave reflected by the sensing target are undulate. Thus, the two output signals generated based on the transmission wave and the reception wave are also formed undulated. Accordingly, a location with a small amount of change of the two output signals, i.e., a location with a lowered sensing accuracy, is formed depending on the distance from the sensor device to the sensing target.

The aforementioned sensor device in Japanese Unexamined Patent Publication No. 2004-286675 determines the presence or absence of an object based on the amount of change of the two output signals provided with a phase difference of 90 degrees. Thus, when the sensing target is in the stationary or generally stationary state at the location with a small amount of change of the two output signals, the sensing accuracy may be lowered. This causes concern about lowering the determination accuracy of the object in the determination part.

SUMMARY

A sensor device according to an embodiment comprises a transmitter part configured to emit a radio wave outside as a transmission wave, a receiver part configured to receive a reflection wave reflected by a sensing object as a reception wave, a signal generation part configured to generate a first output signal generated based on the transmission wave and the reception wave, a second output signal provided with a phase different from that of the first output signal, and a third output signal generated based on the first output signal and the second output signal, and a determination part configured to determine presence or absence of an object based on the first output signal, the second output signal, and the third output signal.

DETAILED DESCRIPTION

Figure 1:
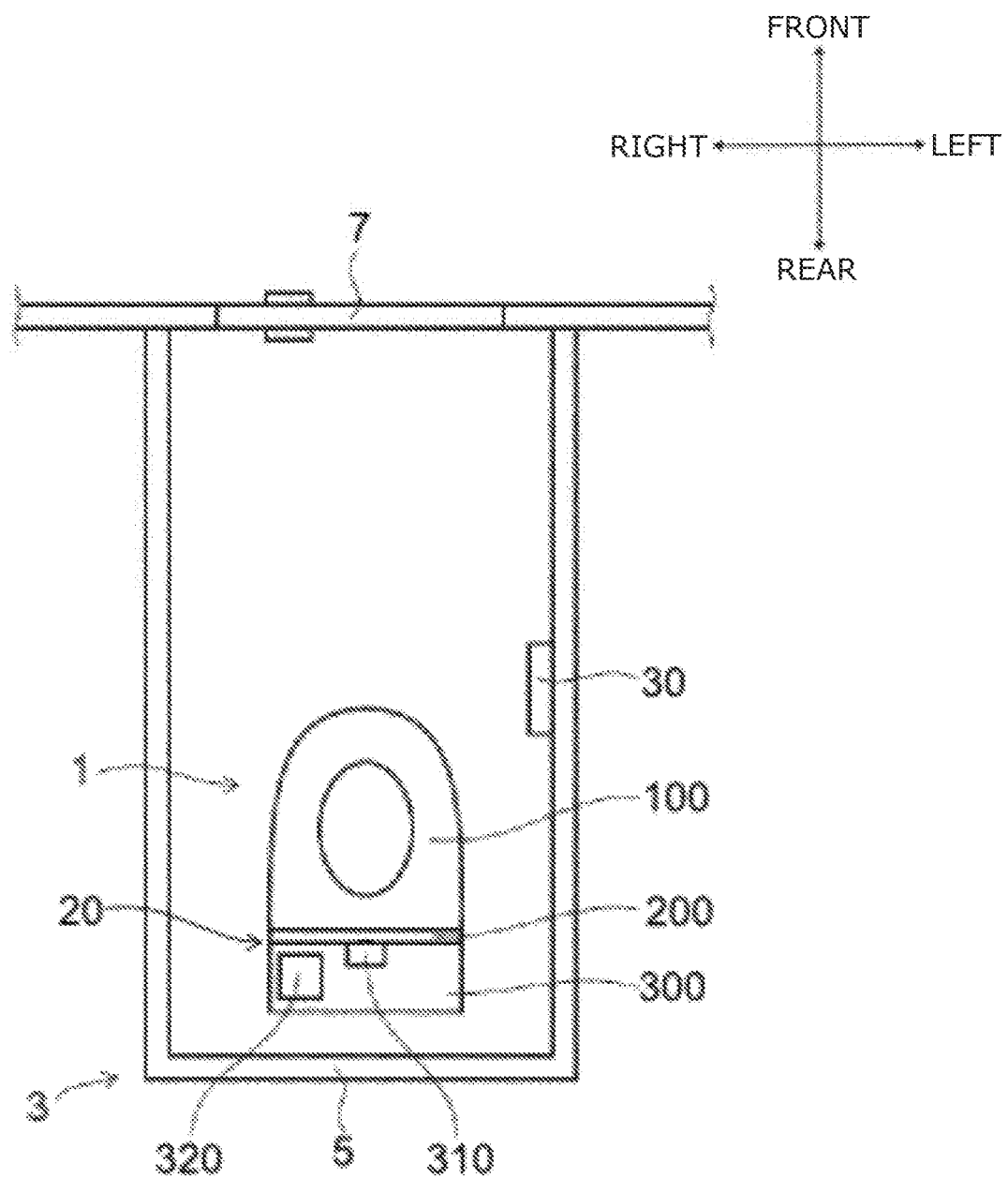
FIG. 1 is a plan view showing a toilet room in which a toilet device according to an embodiment of the invention is installed.

A sensor device according to an embodiment of the invention comprises a transmitter part configured to emit a radio wave outside as a transmission wave, a receiver part configured to receive a reflection wave reflected by an object as a reception wave, a signal generation part configured to generate a first output signal generated based on the transmission wave and the reception wave, a second output signal provided with a phase different from that of the first output signal, and a third output signal generated based on the first output signal and the second output signal, and a determination part configured to determine presence or absence of an object based on the first output signal, the second output signal, and the third output signal.

According to this configuration, the sensor device includes a determination part configured to determine the presence or absence of an object based on the first output signal, the second output signal, and the third output signal. This can improve the sensing accuracy of the sensor device.

The third output signal is generated from the first output signal and the second output signal. This can simplify the sensor circuit. Thus, the productivity of the sensor device can be improved.

In the sensor device according to an embodiment of the invention, preferably, the signal generation part includes a differential amplifier circuit, and the third output signal is a difference signal of the first output signal and the second output signal obtained by outputting the first output signal and the second output signal to the differential amplifier circuit.

According to this configuration, the third output signal is a difference signal generated by the differential amplifier circuit based on the first output signal and the second output signal. Thus, an amplitude larger than the amplitude of the first output signal and the second output signal can be obtained. This can further improve the sensing accuracy of the sensor device.

A toilet device according to an embodiment of the invention comprises a toilet seat and the sensor device.

According to this configuration, the toilet device includes a determination part configured to determine the presence or absence of an object based on the first output signal, the second output signal, and the third output signal. Thus, the behavior of the user such as approaching and leaving the toilet device can be determined more accurately. Accordingly, for instance, the motion of the user can be determined more accurately even during urination in which the user is in the stationary or generally stationary state. This can suppress malfunctions such as closing e.g. The toilet seat and flushing the toilet stool due to erroneous sensing of the sensor device.

In the toilet device according to an embodiment of the invention, preferably, the toilet seat is opened or closed based on a determination result of the determination part.

According to this configuration, the toilet seat is opened or closed based on the determination result of the determination part. This can suppress malfunctions such as closing the toilet seat during urination in which the user is in the stationary or generally stationary state. Thus, the user can use the toilet device more comfortably.

Embodiments of the invention will now be described with reference to the accompanying drawings. In the drawings, similar components are labeled with like reference numerals, and the detailed description thereof is omitted appropriately.

<Configuration of the Toilet Device>

First, a toilet device according to an embodiment of the invention is described with reference to FIGS. 1 to 4.

The following description refers to the directions shown in the figures.

Figure 2:
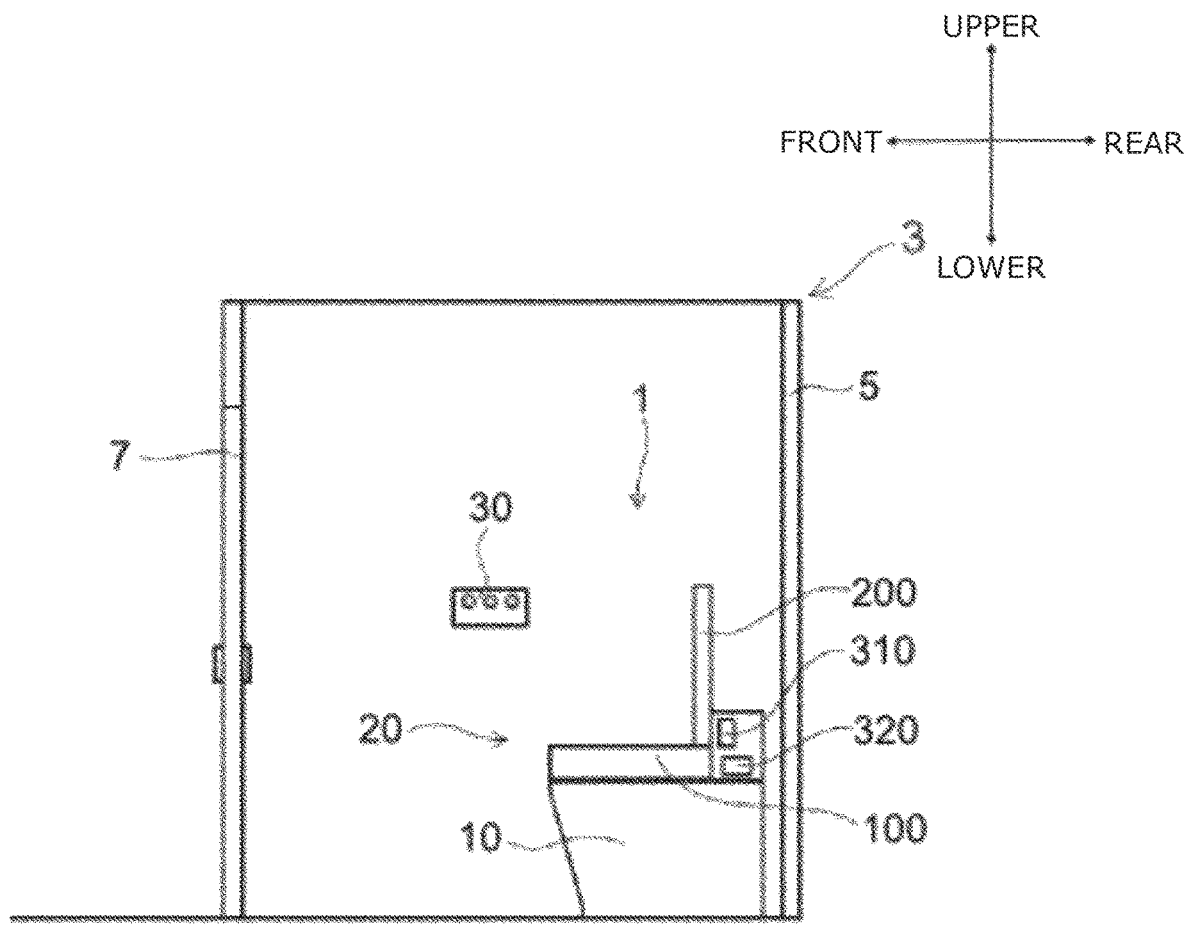
FIG. 2 is a side view showing the toilet room in which the toilet device according to the embodiment of the invention is installed.
Figure 3:
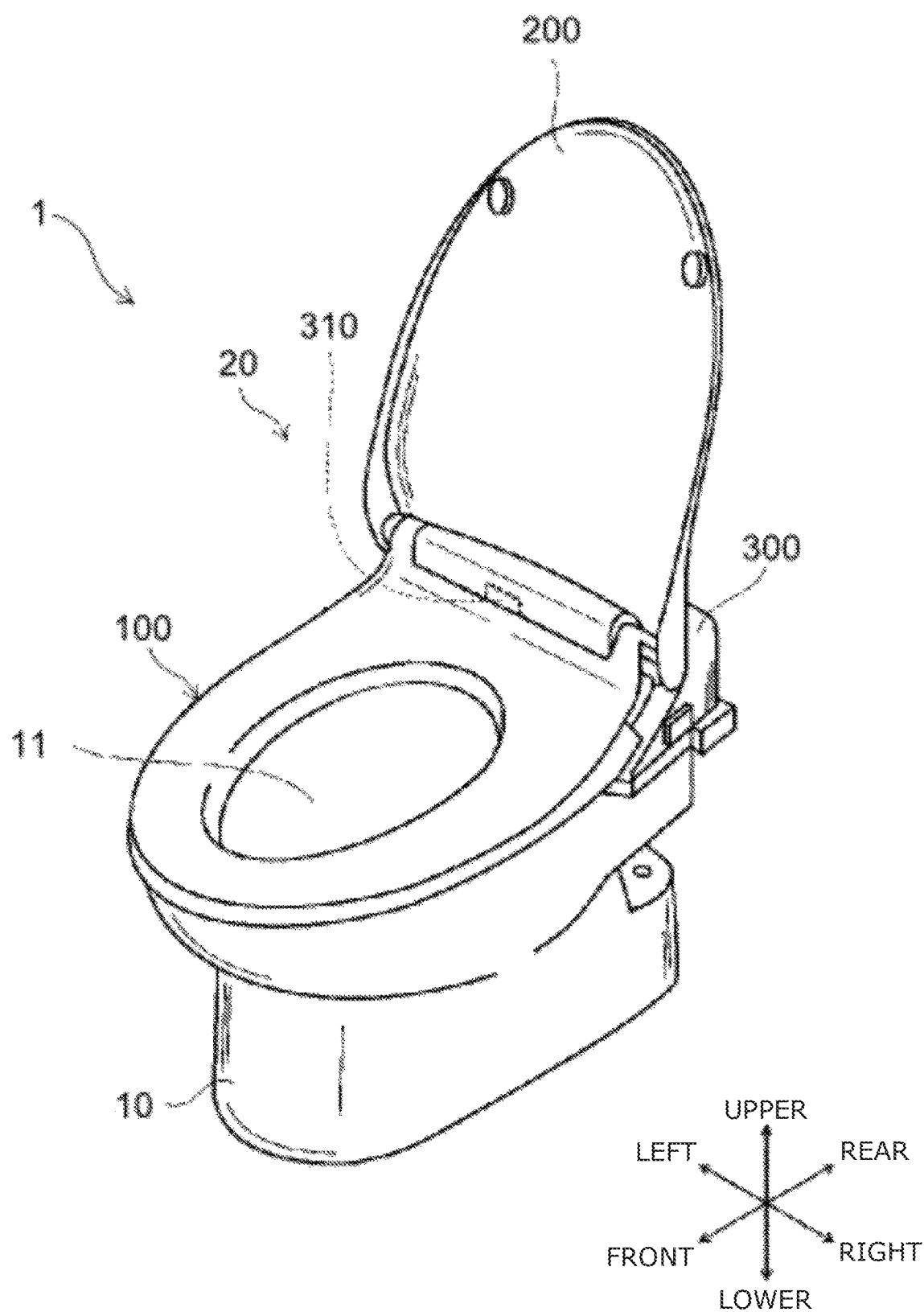
FIG. 3 is a perspective view of the toilet device according to the embodiment of the invention.

FIG. 1 is a plan view showing a toilet room in which a toilet device according to an embodiment of the invention is installed. FIG. 2 is a side view showing the toilet room in which the toilet device according to the embodiment of the invention is installed. FIG. 3 is a perspective view of the toilet device according to the embodiment of the invention.

Figure 4:
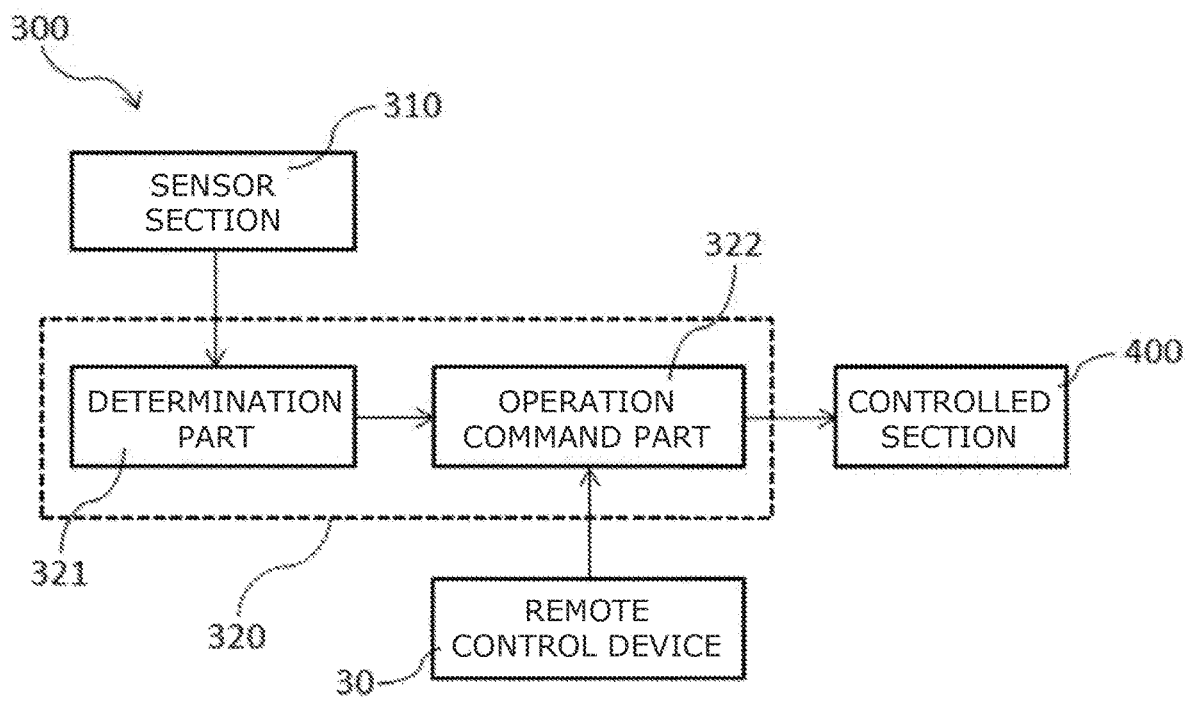
FIG. 4 is a schematic configuration diagram of a toilet seat device according to an embodiment of the invention.

FIG. 4 is a schematic configuration diagram of a toilet seat device according to an embodiment of the invention.

As shown in FIGS. 1 to 4, the toilet device 1 is installed inside the toilet room 3. The toilet room 3 is a space surrounded with walls 5 on the four sides and a door 7 provided in the front wall 5. The user of the toilet device 1, for instance, opens the door 7, enters the toilet room 3, and then closes the door 7 to use the toilet device 1. Alternatively, when not in use, the toilet room 3 is in the state in which the door 7 is opened. The user enters the toilet room 3 and then closes the door 7 to use the toilet device 1.

The toilet device 1 includes is a toilet stool 10 of what is called a sit-down toilet stool, a toilet seat device 20 provided above the toilet stool 10, and a remote control device (remote controller) 30. A bowl part 11 for receiving dirt and urine of the user is formed in the toilet stool 10. A sidewall (wall 5 on a lateral side) in the toilet room 3*l* is provided with e.g. The remote control device 30. The toilet seat device 20 is made operable by this remote control device 30.

The toilet seat device 20 includes a toilet seat 100, a toilet lid 200, a casing 300, and a controlled section 400. The toilet seat 100 and the toilet lid 200 are pivotally supported on the casing 300 in an openable/closeable manner. Here, when the toilet seat 100 is closed, the toilet seat 100 is provided so as to cover the upper rim part of the bowl part 11. When the toilet lid 200 is closed, the toilet lid 200 is provided so as to cover the upper surface of the toilet seat 100 and the inside of the bowl part 11.

A sensor section 310 operable for emitting radio waves to sense a sensing target, and a control section 320 operable for receiving signals from e.g. The sensor section 310 and the remote control device 30 are provided inside the casing 300 of the toilet seat device 20.

In this embodiment, the sensor section 310 and a determination part 321, described later, function as a sensor device.

Specifically, the controlled section 400 is e.g. Ea toilet seat opening/closing unit, a toilet lid opening/closing unit, a private part cleaning unit, a toilet stool flushing unit, a deodorizing unit, and a warm air unit, not shown. Each of these units as the controlled section 400 is operated by a signal from the control section 320.

The sensor section 310 emits high-frequency radio waves such as microwaves or millimeter waves toward a prescribed region, and senses a sensing target such as a human body in the sensing region. Then, the sensor section 310 transmits a sensing signal to the control section 320. The configuration of the sensor section 310 will be described later in detail.

The control section 320 includes a determination part 321 operable for receiving the output signal from the sensor section 310, and an operation command part 322 operable for receiving the signal from the determination part 321 and the remote control device 30 and transmitting a command signal to the controlled section 400.

The determination part 321 receives the output signal from the sensor section 310. Based on the received signal, the determination part 321 determines the presence or absence of an object (sensing target) and approaching/leaving of the object. A specific method for determining the presence or absence of an object and determining approaching/leaving of the object will be described later in detail.

The operation command part 322 receives the signal from the determination part 321 and the remote control device 30. Then, based on the received signal, the operation command part 322 appropriately transmits a command signal to each unit of the controlled section 400 and controls the controlled section 400 so as to perform a prescribed operation. Specifically, when a user of the toilet device 1 pushes a button (not shown) of the remote control device 30 for opening the toilet seat 100, a signal is transmitted from the remote control device 30 to the operation command part 322. The operation command part 322 receives the signal from the remote control device 30. Then, the operation command part 322 transmits a command signal to the toilet seat opening/closing unit of the controlled section 400 and controls the controlled section 400 so as to open the toilet seat 100.

<Configuration of the Sensor Section>

Next, the sensor section according to an embodiment of the invention is described with reference to FIGS. 5 to 7.

Figure 5:
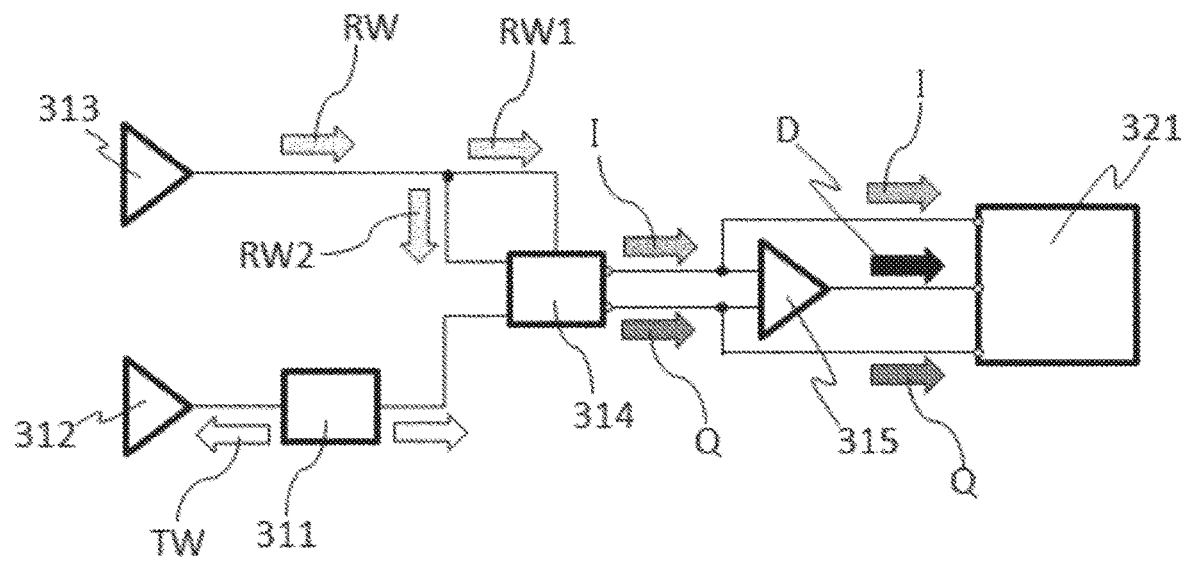
FIG. 5 is a schematic configuration diagram of the sensor section according to an embodiment of the invention.

FIG. 5 is a schematic configuration diagram of the sensor section according to an embodiment of the invention. FIG. 6 is a conceptual view showing the reflection of a radio wave emitted from the sensor section according to the embodiment of the invention. FIG. 7 is an illustration diagram showing the principle of the differential amplifier circuit according to the embodiment of the invention.

Figure 6:
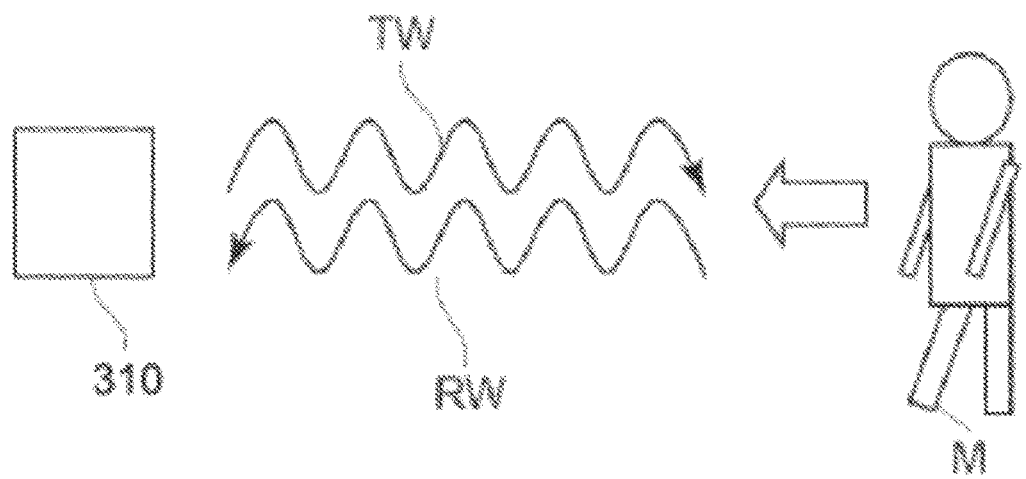
FIG. 6 is a conceptual view showing the reflection of a radio wave emitted from the sensor section according to the embodiment of the invention.
Figure 7:
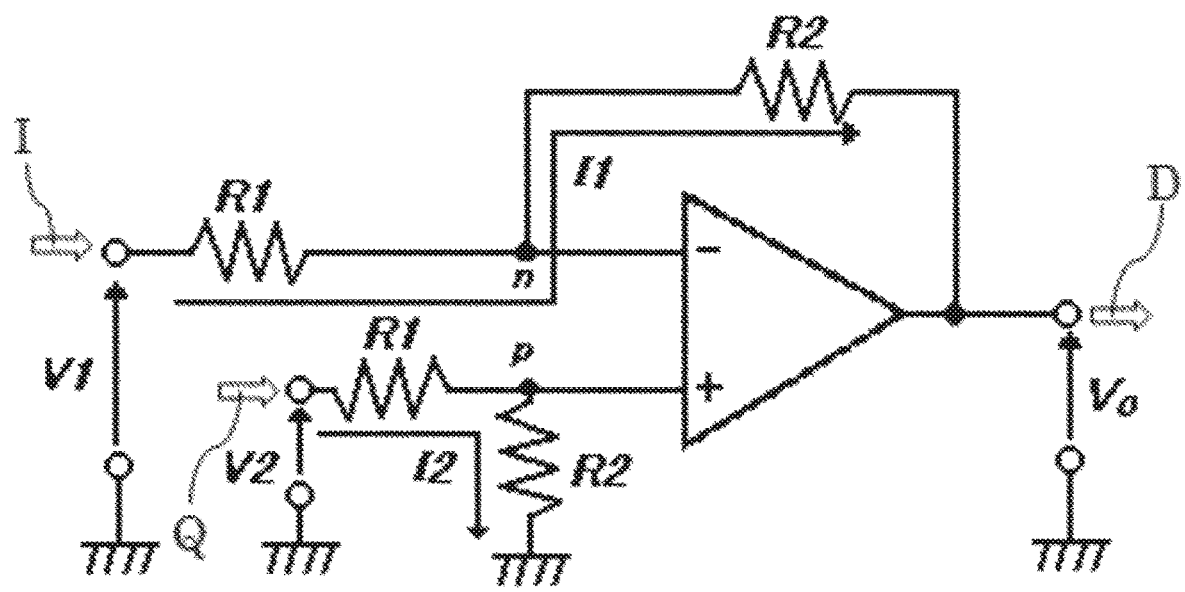
FIG. 7 is an illustration diagram showing the principle of the differential amplifier circuit according to the embodiment of the invention.

As shown in FIGS. 5 and 6, the sensor section 310 includes an oscillator 311 for generating a transmission wave TWO, a transmitter part 312 for emitting a radio wave outside as a transmission wave TWO, a receiver part 313 for receiving a reflection wave reflected by a sensing object as a reception wave, and a mixer circuit 314 for generating an output signal obtained from the transmission wave and the reception wave. The sensor section 310 further includes a differential amplifier circuit 315 provided between the mixer circuit 314 and the determination part 321.

In this embodiment, the mixer circuit 314 and the differential amplifier circuit 315 function as a signal generation part.

The transmission wave TWO generated by the oscillator 311 is transmitted to each of the transmitter part 312 and the mixer circuit 314. The transmission wave TWO transmitted from the oscillator 311 to the transmitter part 312 is emitted outside from the transmitter part 312. The transmission wave TWO transmitted from the transmitter part 312 impinges on a sensing target such as a human body M and is reflected. Then, the reflection wave RE is inputted to the receiver part 313 as a reception wave. The reception wave RE received by the receiver part 313 is transmitted to the mixer circuit 314. Specifically, the transmission path from the receiver part 313 to the mixer circuit 314 is branched into two transmission paths. The line lengths of the two branched transmission paths are different so that the signals traveling one transmission path and the other transmission path are out of phase by 90 degrees with each other. That is, the reception wave RE traveling one transmission path constitutes a reception wave RAW being in phase with the reception wave RE. The reception wave RE traveling the other transmission path constitutes a reception wave RAW provided with a phase difference of 90 degrees with respect to the reception wave RAW.

Thus, the transmission wave TWO and the reception waves RAW, RAW are inputted to the mixer circuit 314.

In the configuration of this embodiment, the transmitter part 312 and the receiver part 313 are provided separately. However, the transmitter part 312 and the receiver part 313 may be integrated. That is, it is also possible to provide only one antenna having the function of the transmitter part 312 and the receiver part 313.

The mixer circuit 314 generates an output signal based on the transmission wave TWO, the reception wave RAW, and the reception wave RAW. Specifically, the mixer circuit 314 combines the transmission wave TWO and the reception wave RAW to generate a first output signal I including the standing wave signal and a signal reflecting the Doppler effect.

Furthermore, based on the transmission wave TWO and the reception wave RAW, the mixer circuit 314 generates a second output signal Q provided with a phase different from that of the first output signal I. Specifically, the second output signal Q is calculated from the transmission wave TWO and the reception wave RAW so as to have a phase difference of 90 degrees with respect to the first output signal I. That is, this embodiment adopts the following method for shifting the phases of two output signals of the first output signal I and the second output signal Q. One transmission wave TWO is transmitted and reflected to form a reception wave RE. Then, the phase of the reception wave RE is shifted. Thus, approaching/leaving of an object (sensing target) can be determined based on the phase difference of two output signals (I, Q).

In this embodiment, the phase difference of the first output signal I and the second output signal Q is not limited to 90 degrees. The phase difference may be arbitrary as long as approaching/leaving of a sensing target can be determined and the presence or absence of a sensing target can be determined.

The method for shifting the phases of two output signals of the first output signal I and the second output signal Q is not limited to the method of this embodiment. For instance, the following method may be adopted. Two transmission waves different in phase, i.e., a transmission wave and a phase-shifted version of this transmission wave, may be generated and emitted. Thus, two output signals (I, Q) may be obtained based on two reception waves shifted in phase with each other.

The first output signal I and the second output signal Q generated by the mixer circuit 314 are outputted to the differential amplifier circuit 315 and the determination part 321. In other words, the first output signal I is outputted to the differential amplifier circuit 315 and the determination part 321. Like the first output signal I, the second output signal Q is also outputted to the differential amplifier circuit 315 and the determination part 321.

The differential amplifier circuit 315 generates a third output signal D based on the first output signal I and the second output signal Q inputted from the mixer circuit 314. Specifically, the differential amplifier circuit 315 calculates the difference between the first output signal I and the second output signal Q to obtain a third output signal D as the calculated difference signal. The third output signal D thus generated by the differential amplifier circuit 315 is outputted to the determination part 321.

That is, three output signals of the first output signal I, the second output signal Q, and the third output signal D are inputted to the determination part 321.

Here, the differential amplifier circuit 315 is described in detail with reference to FIG. 7. The differential amplifier circuit 315 includes an operational amplifier and a plurality of resistors (R1, R2).

In this differential amplifier circuit 315, by imaginary short (virtual short), the output voltage V1 of the first output signal I can be represented by the following equation (1).

[Math1]

$$V_1 - R_1 I_1 = R_2 R_2 \tag{1}$$

Furthermore, the following equation (2) can be determined from the high-impedance characteristics of the operational amplifier input.

[Math 2]

$$I_1 = \frac{V_1 - V_0}{R_1 + R_2}, \quad I_2 = \frac{V_2}{R_1 + R_2} \quad (2)$$

From the above equations (1) and (2), the output voltage V0 of the third output signal D can be represented by the following equation (3).

[Math 3]

$$V_0 = \frac{R_2}{R_1} \cdot (V_2 - V_1) \quad (3)$$

Furthermore, the output voltage V1 of the first output signal I and the output voltage V2 of the second output signal Q having a phase difference of 90 degrees with respect to the first output signal I are represented by the following equation (4).

[Math 4]

$$V_1 = A \sin \omega t, \quad V_2 = A \sin (\omega t + \pi/2) \quad (4)$$

Furthermore, if R1=R2, i.e., the gain is 1 (constant), then the relation of the output voltage V0 of the third output signal D to the output voltage V1 of the first output signal I and the output voltage V2 of the second output signal Q can be represented by the following equation (5).

[Math 5]

$$V_0 = V_2 - V_1 = A\sin(\omega t + \pi/2) - A\sin(\omega t) = \sqrt{2} \cdot A\cos\left(\omega t + \frac{\pi}{4}\right) \quad (5)$$

Thus, the amplitude of the output voltage V0 of the third output signal is √2 times the amplitude of the output voltage V1 of the first output signal I (or the output voltage V2 of the second output signal Q). Furthermore, the output voltage V0 of the third output signal D has a waveform of the cosine function with a phase lead of π/4. That is, the differential amplifier circuit 315 can obtain a third output signal D having an amplitude larger than that of the output voltage of the first output signal I and the second output signal Q and being different in phase with the output voltage of the first output signal I and the second output signal Q.

<Operation and Function>

Next, the operation and function of the sensor section and the toilet device according to an embodiment of the invention is described with reference to FIGS. 8 and 9.

Figure 8:
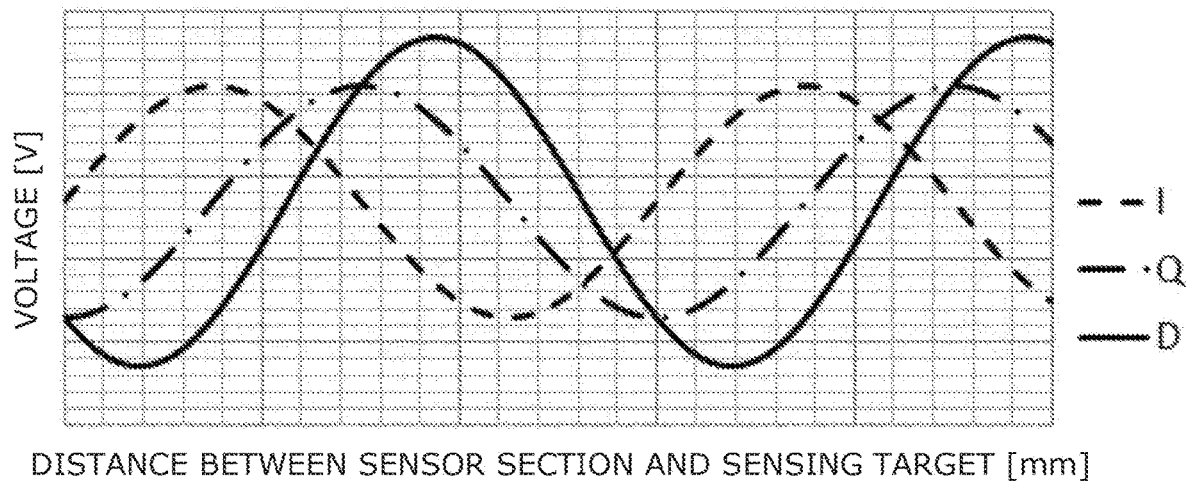
FIG. 8 is a graph showing the relationship among the output voltages of the first output signal, the second output signal, and the third output signal according to an embodiment of the invention.

FIG. 8 is a graph showing the relationship among the output voltages of the first output signal, the second output signal, and the third output signal according to an embodiment of the invention. FIG. 9 is a graph obtained by full-wave rectifying the output voltages of the first output signal, the second output signal, and the third output signal according to the embodiment of the invention.

Figure 9:
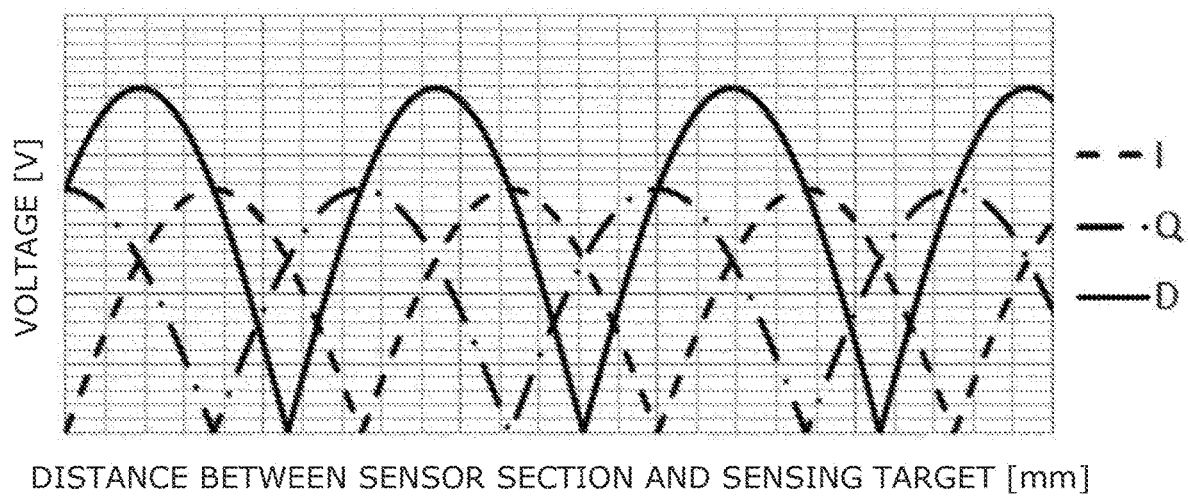
FIG. 9 is a graph obtained by full-wave rectifying the output voltages of the first output signal, the second output signal, and the third output signal according to the embodiment of the invention.

In FIGS. 8 and 9, the dashed line indicates the output voltage of the first output signal I. The dot-dashed line indicates the output voltage of the second output signal Q. The solid line indicates the output voltage of the third output signal D.

As shown in FIG. 8, three output signals (I, Q, D) are inputted from the sensor section 310 to the determination part 321. The determination part 321 determines the presence or absence of a sensing target (such as a user) based on the output voltage of the three output signals (I, Q, D) inputted thereto. Specifically, the determination part 321 monitors all the amounts of change of the output voltage of the first output signal I, the output voltage of the second output signal Q, and the output voltage of the third output signal D. Then, among the amounts of change of the output voltage of the three output signals (I, Q, D), if at least one amount of change is not less than a preset threshold, then the determination part 321 determines that a sensing target is present. On the other hand, if all the amounts of change of the output voltage of the three output signals (I, Q, D) fall below the threshold and remain below the threshold for a prescribed time, then the determination part 321 determines that a sensing target is absent. The determination result in the determination part 321 is sent to the operation command part 322. The operation command part 322 appropriately transmits a signal to the controlled section 400 based on the determination result in the determination part 321.

In this embodiment, the threshold used for determining the presence or absence of a sensing target such as a user is set to 0.5 V (volts), and the prescribed time is set to 5 seconds. The threshold and the prescribed time can be set appropriately in accordance with e.g. The situation in which the toilet device 1 is installed.

As shown in FIG. 9, the three output signals (I, Q, D) inputted to the determination part 321 are full-wave rectified for an arbitrary reference voltage. The full-wave rectification can produce a trajectory of the maximum of the output voltage of the three output signals (I, Q, D) to derive a value generally uniquely. This enables approximate calculation of the distance from the sensor section 310 to the sensing target. Furthermore, the control section 320 can calculate the movement distance of the sensing target and determine e.g. whether the sensing target approaches or leaves the sensor section 310 by measuring e.g. The waveform pattern and the number of waves of the first output signal I and the second output signal Q.

As an alternative configuration, the determination of the presence or absence of a sensing target may be made based on the generally unique value derived by full-wave rectifying the three output signals (I, Q, D). Alternatively, the amount of change of the output voltage of the three output signals (I, Q, D) may be monitored after full-wave rectification.

As a specific operation of the toilet device 1, for instance, the determination part 321 determines whether or not a human body has entered the toilet room 3 and approached the toilet stool 10 based on the output voltage of the three full-wave rectified output signals (I, Q, D) and the waveform pattern of the output signals I, Q. Upon determining that a human body has entered the toilet room 3 and approached the toilet stool 10 by a prescribed distance, the determination part 321 monitors e.g. The amount of change of the output voltage of the three output signals (I, Q, D). Then, it is sensed that the human body has left the toilet stool 10 by a prescribed distance. Alternatively, all the amounts of change of the output voltage of the three output signals (I, Q, D) fall below 0.5 V, and this state continues for 5 seconds. Then, the determination part 321 determines that the human body is absent. Furthermore, when the toilet seat 100 is in the opened state, if the determination part 321 determines that the human body is absent, then the toilet seat 100 may be closed.

The determination part 321 may be configured to determine the presence or absence of a human body based on the first output signal I, the second output signal Q, and the third output signal D only when e.g. The toilet seat 100 is opened by a user, or the toilet seat 100 is in the opened state. Thus, the determination is made based on only the two output signals of the first output signal I and the second output signal Q when the toilet seat 100 is in the closed state. This can reduce the load on the control section 320.

Furthermore, opening/closing of the toilet lid 200, the toilet stool flushing operation, and other operations by the controlled section 400 may be performed based on the determination result of the determination part 321 of the control section 320.

Here, a simulation result is described with reference to FIGS. 10 to 12 assuming that a human body exists at a position around 100 mm (millimeters) from the front tip of the toilet stool 10.

Figure 10:
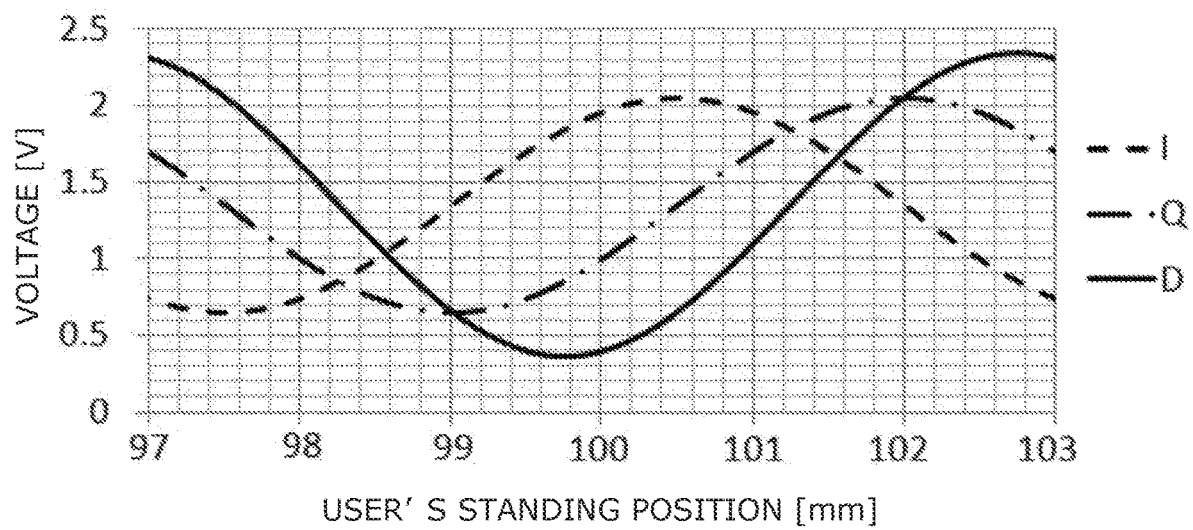
FIG. 10 is a graph showing a simulation result of the sensor section according to an embodiment of the invention.
Figure 11:
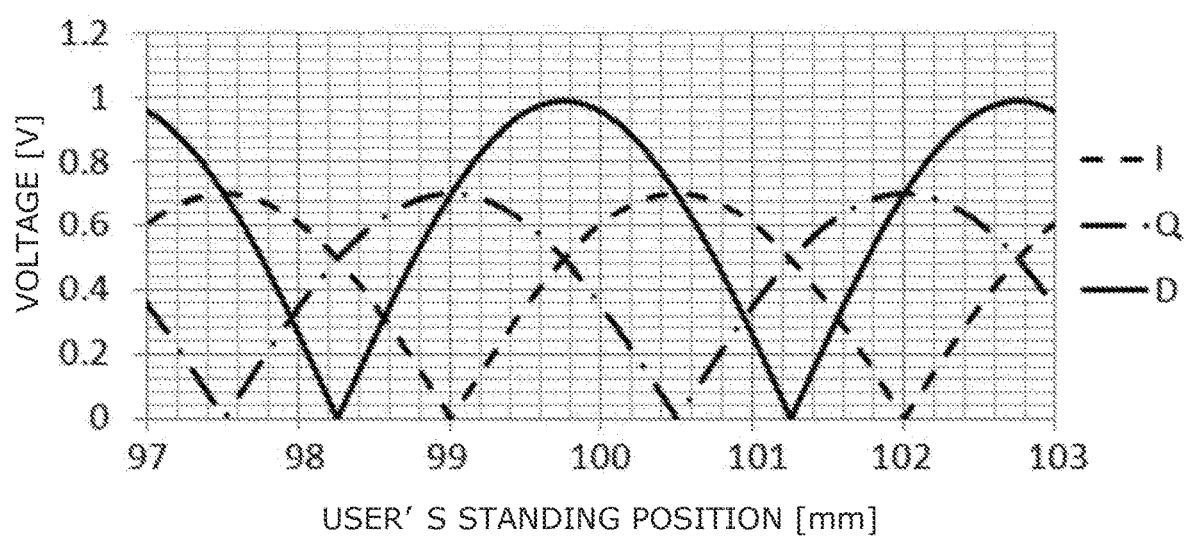
FIG. 11 is a graph showing a simulation result of the sensor section according to an embodiment of the invention.
Figure 12:
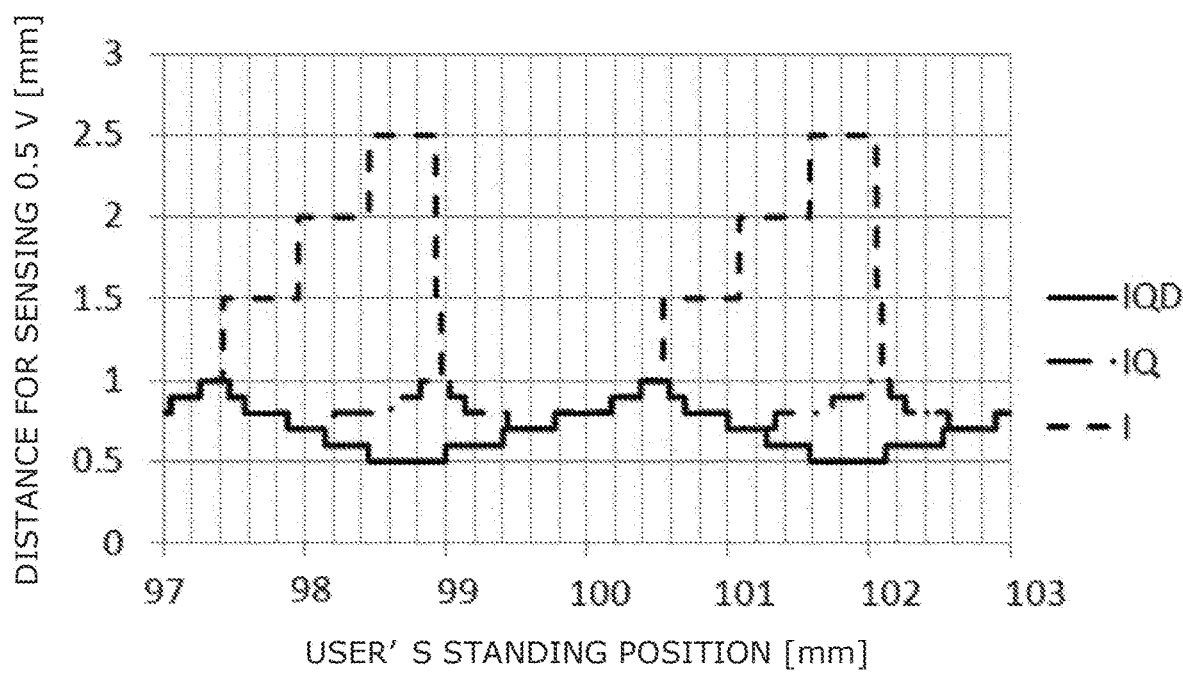
FIG. 12 is a graph showing a simulation result of the sensor section according to an embodiment of the invention.

FIGS. 10 to 12 are graphs showing a simulation result of the sensor section according to an embodiment of the invention. Specifically, FIG. 10 is a graph showing the relationship among the output voltages of the three output signals (I, Q, D) inputted to the determination part 321. FIG. 11 is a graph obtained by full-wave rectifying the three output signals (I, Q, D) inputted to the determination part 321. FIG. 12 is a graph showing the relationship between the standing position of a human body and the movement distance required for sensing 0.5 V.

In FIGS. 10 and 11, the dashed line indicates the output voltage of the first output signal I. The dot-dashed line indicates the output voltage of the second output signal Q. The solid line indicates the output voltage of the third output signal D. In FIG. 12, the dashed line indicates the case of using the first output signal I. The dot-dashed line indicates the case of using the first output signal I and the second output signal Q. The solid line indicates the case of using the first output signal I, the second output signal Q, and the third output signal D.

In this simulation, the frequency of the transmission wave TWO transmitted from the transmitter part 312 of the sensor section 310 is set to approximately 24 GHz.

As shown in FIGS. 10 to 12, in the case of determining the presence or absence of a human body based on only the first output signal I, sensing the threshold, e.g. 0.5 V, for the amount of change of the output voltage for determining the presence or absence of a human body requires movement of the human body by approximately 0.7-2.5 mm or more. In the case of determining the presence or absence of a human body based on the two output signals of the first output signal I and the second output signal Q, sensing an output voltage of the sensing signal of 0.5 V requires movement by approximately 0.7-1.0 mm or more.

In order to use the toilet device 1 to urinate in the standing state, a user may open the toilet seat 100 and come to a generally stationary state in front of the toilet stool 10. Then, in the above settings, fine motions of a human body may fail to be sensed. The control section 320 may determine that a human body is absent. This causes concern about e.g. automatic closing of the toilet seat 100.

On the other hand, in the case of determining the presence or absence of a human body based on the three output signals of the first output signal I, the second output signal Q, and the third output signal D, an output voltage of the sensing signal of 0.5 V can be obtained if a sensing target (user) moves by approximately 0.5-1.0 mm or more.

Furthermore, the third output signal D is different in phase from the first output signal I and the second output signal Q. Thus, a portion with a large amount of change of the output voltage can be provided by the third output signal D even in a portion with a small amount of change of the output voltage of the two output signals (I, Q) (e.g., in FIG. 12, the range of the user's standing position between approximately 98.5 mm and approximately 99 mm). Thus, compared with the case of sensing based on the two output signals (I, Q), sensing accuracy is further improved in the case of sensing based on the three output signals (I, Q, D).

Thus, the sensor device according to an embodiment of the invention includes a determination part 321 configured to determine the presence or absence of an object (e.g., human body) based on the first output signal I, the second output signal Q, and the third output signal D. This can improve the sensing accuracy of the sensor section 310.

The third output signal D is generated from the first output signal I and the second output signal Q. This can simplify the sensor circuit. Thus, the productivity of the sensor section 310 can be improved.

In the sensor device according to an embodiment of the invention, the third output signal D is a difference signal generated by the differential amplifier circuit 315 based on the first output signal I and the second output signal Q. Thus, an amplitude larger than the amplitude value of the first output signal I and the second output signal Q can be obtained. This can further improve the sensing accuracy of the sensor section 310.

Here, for instance, it is possible to consider a method for obtaining the third output signal D by simply amplifying and phase-shifting one of the first output signal I and the second output signal Q. However, if the first output signal I or the second output signal Q is simply amplified, noise is also amplified simultaneously. This causes concern about erroneous sensing of the sensor section 310.

Furthermore, the toilet device 1 according to an embodiment of the invention includes a determination part 321 configured to determine the presence or absence of an object based on the first output signal I, the second output signal Q, and the third output signal D. Thus, the behavior of the user of the toilet device 1 such as approaching and leaving can be determined more accurately. Accordingly, for instance, the motion of the user can be determined more accurately even during urination in which the user is in the stationary or generally stationary state. This can suppress malfunctions such as closing e.g. The toilet seat 100 and flushing the toilet stool due to erroneous sensing of the sensor section 310.

In the toilet device 1 according to an embodiment of the invention, the toilet seat 100 is opened or closed based on the determination result of the determination part 321. This can suppress malfunctions such as closing the toilet seat 100 during urination in which the user is in the stationary or generally stationary state. Thus, the user can use the toilet device 1 more comfortably.

<Variations>

The embodiment of the invention has been described above. However, the invention is not limited to the aforementioned embodiment.

For instance, a filter for removing noise in the radio waves and signals may be provided in e.g. The sensor section 310 and the control section 320.

The phase difference between the first output signal I and the second output signal Q is not limited to 90 degrees. The phase difference may be arbitrary as long as an output voltage enabling sensing of a sensing target is obtained when the output voltage of the first output signal I and the second output signal Q is full-wave or half-wave rectified.

The sensor section 310 and the control section 320 are separated in the configuration described above. However, the sensor section 310 and the control section 320 may be integrated. As an alternative configuration, the sensor section 310 may be included in the control section 320. Alternatively, only the determination part 321 may be included in the sensor section 310.

Various components in the aforementioned embodiments can be combined with each other as long as technically feasible. Such combinations are also encompassed within the scope of the invention as long as they include the features of the invention.

What is claimed is:

1. A sensor device comprising:
   a transmitter part configured to emit a radio wave outside as a transmission wave;
   a receiver part configured to receive a reflection wave reflected by an object as a reception wave;
   a signal generation part configured to generate a first output signal generated based on the transmission wave and the reception wave, a second output signal provided with a phase different from that of the first output signal, and a third output signal generated based on the first output signal and the second output signal, the signal generation part having a first output terminal configured to output the first output signal, a second output terminal configured to output the second output signal, and a third output terminal configured to output the third output signal; and
   a controller connected to the first output terminal, the second output terminal, and the third output terminal, and configured to receive the first output signal, the second output signal, and the third output signal and determine presence or absence of an object based on the first output signal, the second output signal, and the third output signal,
   the controller monitoring a first change amount of a first output voltage of the first output signal, a second change amount of a second output voltage of the second output signal, and a third change amount of a third output voltage of the third output signal, and
   the controller determining that
      the object is present when at least one of the first change amount, the second change amount, and the third change amount is not less than a preset threshold, and
      the object is absent when all of the first change amount, the second change amount, and the third change amount fall below the threshold and remain below the threshold for a prescribed time.

2. The device according to claim 1, wherein
   the signal generation part includes a differential amplifier circuit, and
   the third output signal is a difference signal of the first output signal and the second output signal obtained by the differential amplifier circuit.

3. A toilet device comprising:
   a toilet seat; and
   the sensor device according to claim 1.

4. The device according to claim 3, wherein the toilet seat is opened or closed based on a determination result of the controller.

5. The device according to claim 1, wherein
   the first change amount is a voltage value of the first output voltage after full-wave rectification,
   the second change amount is a voltage value of the second output voltage after full-wave rectification, and
   the third change amount is a voltage value of the third output voltage after full-wave rectification.

6. A sensor device comprising:
   a transmitter part configured to emit a radio wave outside as a transmission wave;
   a receiver part configured to receive a reflection wave reflected by an object as a reception wave;
   a signal generation part configured to generate a first output signal generated based on the transmission wave and the reception wave, a second output signal provided with a phase different from that of the first output signal, and a third output signal generated based on the first output signal and the second output signal, a phase of the third output signal being different from that of the first output signal and that of the second output signal, the signal generation part having a first output terminal configured to output the first output signal, a second output terminal configured to output the second output signal, and a third output terminal configured to output the third output signal; and
   a controller connected to the first output terminal, the second output terminal, and the third output terminal, and configured to receive the first output signal, the second output signal, and the third output signal and determine presence or absence of an object based on the first output signal, the second output signal, and the third output signal.

* * * * *

UNITED STATES PATENT AND TRADEMARK OFFICE
CERTIFICATE OF CORRECTION

PATENT NO. : 10,705,197 B2
APPLICATION NO. : 15/461735
DATED : July 7, 2020
INVENTOR(S) : Shoichi Tsuiki Page 1 of 2

It is certified that error appears in the above-identified patent and that said Letters Patent is hereby corrected as shown below:

In the Specification

Column 4, Line 17, "room 3/ is provided" should read -- room 3 is provided --

Column 5, Line 23, "wave TWO, a" should read -- wave TW, a --

Column 5, Line 24, "wave TWO generated" should read -- wave TW generated --

Column 5, Line 34, "wave TWO, a" should be -- wave TW, a --

Column 5, Line 36, "wave TWO transmitted" should read -- wave TW transmitted --

Column 5, Line 39, "TWO transmitted" should read -- TW transmitted --

Column 5, Line 41, "wave RE is inputted" should read -- wave RW is inputted --

Column 5, Line 42, "wave RE received" should read -- wave RW received --

Column 5, Line 50, "RE traveling one" should read -- RW traveling one --

Column 5, Line 51, "wave RAW being in phase with the reception wave RE." should read -- wave RW1 being in phase with the reception wave RW. --

Column 5, Line 52, "wave RE traveling" should read -- wave RW traveling one --

Column 5, Line 53, "wave RAW provided" should read -- wave RW1 provided --

Column 5, Line 55, "RAW." should read -- RW1. --

Column 5, Line 56, "wave TWO and" should read -- wave TW and --

Signed and Sealed this
Thirteenth Day of October, 2020

Andrei Iancu
*Director of the United States Patent and Trademark Office*

CERTIFICATE OF CORRECTION (continued)
U.S. Pat. No. 10,705,197 B2

Column 5, Line 57, "waves RAW, RAW are" should read -- waves RW1, RW2 are --

Column 5, Line 65, "wave TWO, the reception wave RAW, and" should read -- wave TW, the reception wave RW1, and --

Column 5, Line 66, "wave RAW. Specifically" should read -- wave RW2. Specifically --

Column 5, Line 67, "wave TWO and the reception" should read -- wave TW and the reception --

Column 6, Line 1, "wave RAW to generate" should read -- wave RW1 to generate --

Column 6, Line 4, "transmission wave TWO and" should read -- transmission wave TW and --

Column 6, Line 5, "wave RAW, the mixer" should read -- wave RW2, the mixer --

Column 6, Line 9, "TWO and the reception wave RAW so as" should read -- TW and the reception wave RW2 so as --

Column 6, Line 14, "wave TWO is transmitted" should read -- wave TW is transmitted --

Column 6, Line 15, "wave RE. Then, the phase of the reception wave RE is" should read -- wave RW. Then, the phase of the reception wave RW is --

Column 9, Line 37, "TWO transmitted from" should read -- TW transmitted from --